(12) United States Patent
Okumura et al.

(10) Patent No.: US 10,775,200 B2
(45) Date of Patent: Sep. 15, 2020

(54) ROTARY ENCODER AND ABSOLUTE ANGULAR POSITION DETECTION METHOD THEREOF

(71) Applicant: NIDEC SANKYO CORPORATION, Suwa-gun, Nagano (JP)

(72) Inventors: Hirokatsu Okumura, Suwa-gun Nagano (JP); Yutaka Saito, Suwa-gun Nagano (JP); Hitoshi Joko, Suwa-gun Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 268 days.

(21) Appl. No.: 15/896,481

(22) Filed: Feb. 14, 2018

(65) Prior Publication Data
US 2018/0231399 A1 Aug. 16, 2018

(30) Foreign Application Priority Data
Feb. 14, 2017 (JP) .................... 2017-024895

(51) Int. Cl.
*G01D 5/245* (2006.01)
*G01B 7/30* (2006.01)
*G01D 5/14* (2006.01)

(52) U.S. Cl.
CPC .............. *G01D 5/2451* (2013.01); *G01B 7/30* (2013.01); *G01D 5/2454* (2013.01); *G01D 5/145* (2013.01)

(58) Field of Classification Search
CPC .......... G01B 7/003; G01B 7/30; G01D 5/142; G01D 5/145; G01D 5/147; G01D 5/16; G01D 5/165; G01R 33/02; G01R 33/025; G01R 33/09; H02P 6/17; H02P 21/18

USPC .......... 324/207.12, 207.13, 207.25; 702/151
See application file for complete search history.

(56) References Cited

U.S. PATENT DOCUMENTS

| 5,757,180 | A | * | 5/1998 | Chou | G01D 5/145 324/207.2 |
| 6,498,409 | B1 | * | 12/2002 | Collier-Hallman | G01D 5/145 310/68 B |
| 7,042,211 | B2 | * | 5/2006 | Kabashima | G01D 5/04 324/207.25 |
| 7,923,993 | B2 | * | 4/2011 | Takahashi | F16C 41/007 324/207.25 |
| 8,803,510 | B2 | * | 8/2014 | Takahashi | G01D 5/2457 324/207.13 |
| 2010/0050731 | A1 | * | 3/2010 | Granig | G01D 5/145 73/1.11 |
| 2010/0225307 | A1 | * | 9/2010 | Takahashi | G01P 3/443 324/207.25 |

(Continued)

FOREIGN PATENT DOCUMENTS

JP 5666886 B2 12/2014

*Primary Examiner* — Steven L Yeninas
(74) *Attorney, Agent, or Firm* — Cantor Colburn LLP

(57) ABSTRACT

A rotary encoder may include a first sensor unit including a first magnet, and a first magnetosensitive unit facing the first magnet; a second sensor unit including a second magnet with a plurality of pairs of N poles and S poles alternately magnetized, and a second magnetosensitive unit facing the second magnet; a circuit to generate pulses for counting from an output of the second sensor unit; and a counter to count the pulses. During activation, an angle position of the rotating body is calculated based on outputs of a first and second sensor unit, and after activation, pulse counting is counted by a counter.

10 Claims, 6 Drawing Sheets

(56) References Cited

U.S. PATENT DOCUMENTS

| | | | |
|---|---|---|---|
| 2010/0225309 A1* | 9/2010 | Takahashi | G01D 5/2452 |
| | | | 324/207.25 |
| 2014/0176125 A1* | 6/2014 | Friedrich | G01R 33/0023 |
| | | | 324/207.2 |
| 2015/0130446 A1* | 5/2015 | Granig | G01R 33/025 |
| | | | 324/207.23 |
| 2019/0265069 A1* | 8/2019 | Roberts | G01D 5/145 |

* cited by examiner

FIG. 2
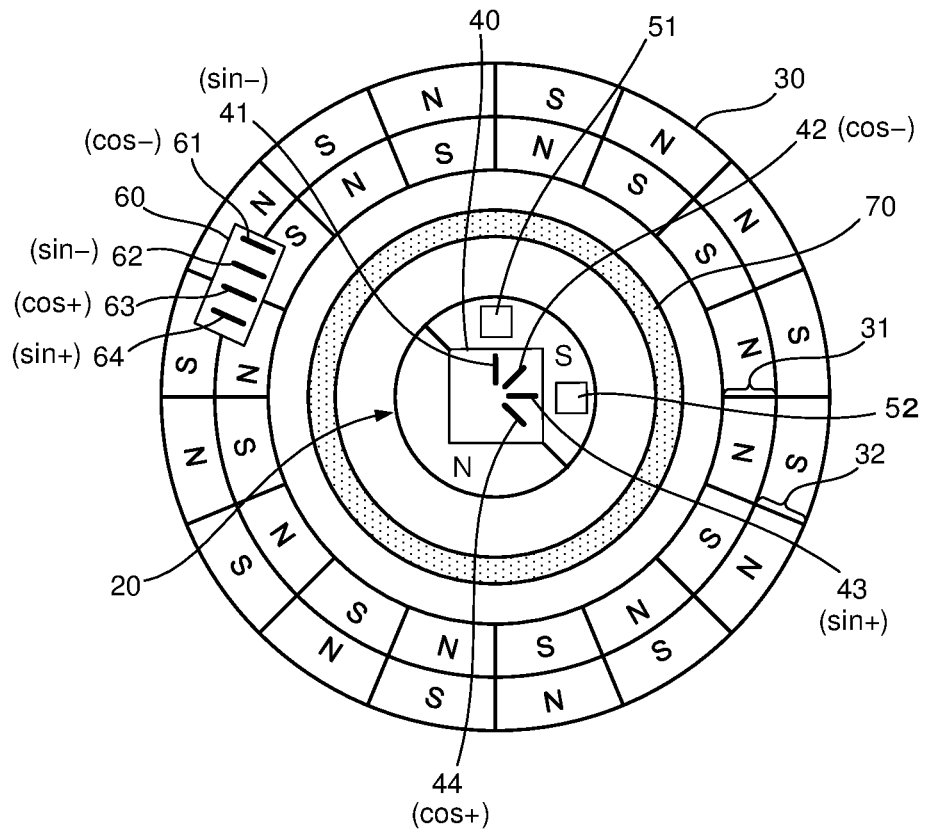
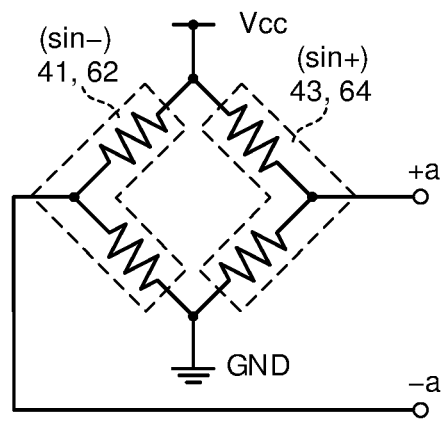
FIG. 3A
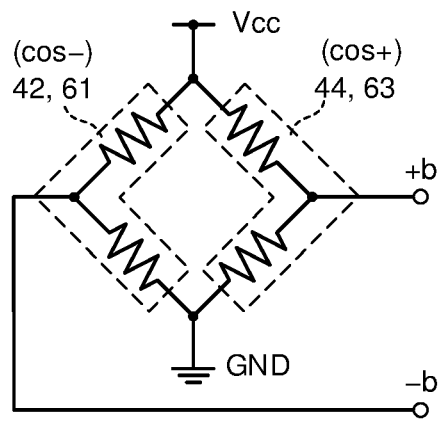
FIG. 3B

FIG. 4A
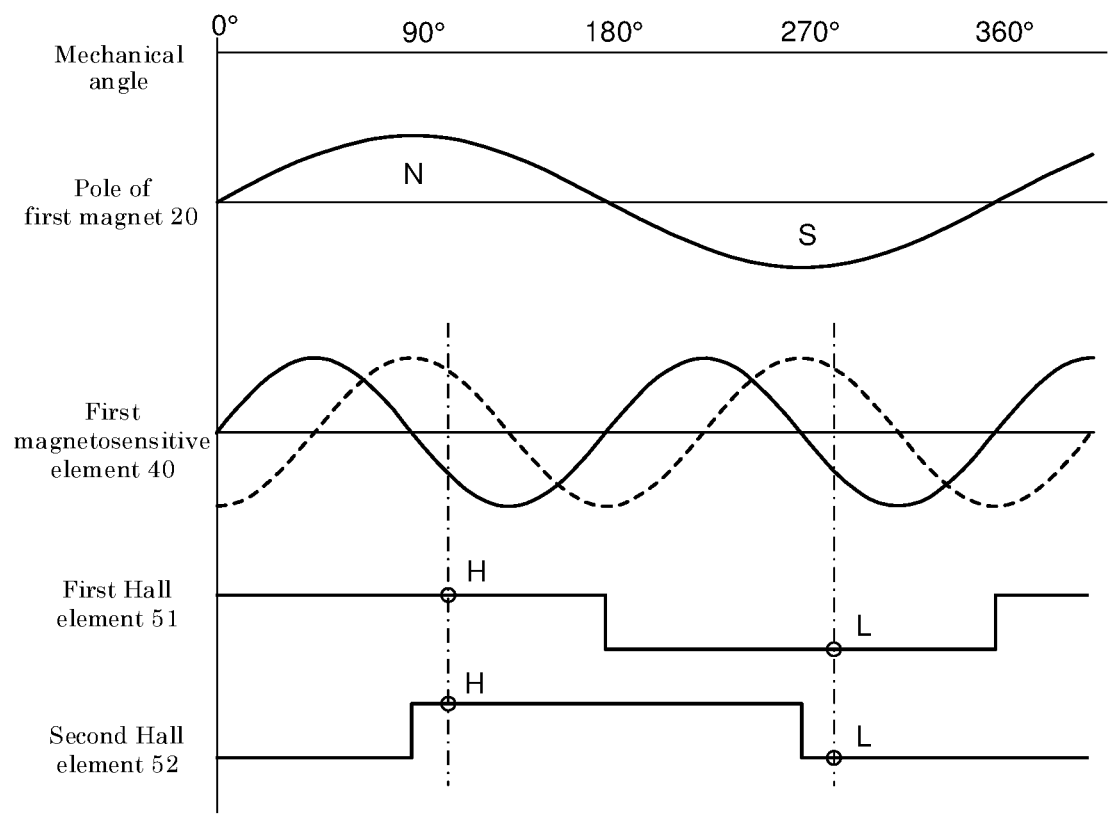
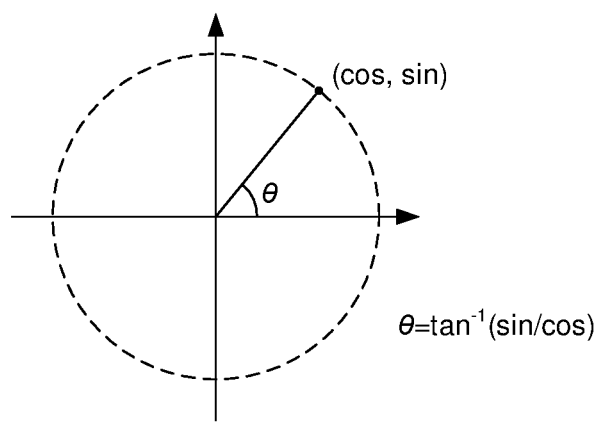
FIG. 4B

ROTARY ENCODER AND ABSOLUTE ANGULAR POSITION DETECTION METHOD THEREOF

CROSS REFERENCE TO RELATED APPLICATION

The present application claims priority under 35 U.S.C. § 119 to Japanese Application No. 2017-024895 filed Feb. 14, 2017, the entire content of which is incorporated herein by reference.

TECHNICAL FIELD

At least an embodiment of the present invention relates to a magnetic rotary encoder for detecting an absolute angular position of a rotating body and an absolute angular position detection method in a magnetic rotary encoder.

BACKGROUND

As a rotary encoder for detecting an absolute angular position of a rotating body, a magnetic rotary encoder is known, in which a magnet is attached to a rotating body, a magnetic field generated by the magnet is detected by a magnetosensitive element (magnetic sensor) provided close to the rotating body, and a rotation angle is determined based on the fact that the intensity of a detected magnetic field changes in accordance with a rotation angle of a rotating body. As an example, a magnet with an N pole and an S pole magnetized in a circumferential direction is disposed on an end face of a rotation axis of a rotating body, and a magnetosensitive element having an output proportional to the magnitude of the magnetic field by this magnet is arranged on the extension of the rotation axis in a fixed body. As a magnetosensitive element, one capable of detecting the intensity of the magnetic field at two positions shifted by 45° from each other with respect to the rotation of the rotary shaft is used. Alternatively, in the case of using an element, like a Hall element, capable of detecting the intensity of the magnetic field including the direction of the magnetic field, a magnetosensitive element is disposed at a position shifted by 90° from each other with respect to the rotation of a rotation axis. Then, the magnetosensitive element provides outputs that change with a sine function (sin) and a cosine function (cos) against the rotation angle of the rotating body, and the rotation angle, that is, the absolute angular position of the rotating body can be obtained by calculating an angular position by arctangent ($\tan^{-1}$ or arctan) operation for the ratio of these outputs.

In order to increase the resolution of rotation angle detection in such a magnetic rotary encoder, Patent Document 1 discloses that when the magnet and the magnetosensitive element in the above configuration are provided respectively as a first magnet and a first magnetosensitive element, a second magnet disposed annularly around the rotation axis is provided on the rotating body, and a second magnetosensitive element for detecting the magnitude of the magnetic field generated by the second magnet is provided on the fixed body. In the second magnet, a plurality of pairs of N poles and S poles are magnetized alternately along the circumferential direction of the rotor. In other words, the plurality of N poles and the same number of S poles are alternately arranged in the circumferential direction of the rotor. The second magnetosensitive element is configured to be able to detect a magnitude of magnetization in each of positions spaced apart by a distance corresponding to a quarter of the circumferential length of a single pole of N pole or S pole, that is, a magnitude of a magnetic field due to the magnetization of the second magnet (in the case where it is possible to detect the intensity including the direction of the magnetic field, like the Hall element, a detection position interval is assumed to be half of the circumferential length of a single pole of N pole or S pole). In this configuration, when the rotating body rotates by an angle corresponding to the circumferential length of a single pole of N pole or S pole, the second magnetosensitive element outputs sine and cosine outputs similar to the sine and cosine outputs from the first magnetosensitive element when the rotor rotates once. Therefore, arctangent calculation is performed based on the output of the first magnetosensitive element to find which N pole or S pole of the second magnet the current rotation angle corresponds to, and then by performing arctangent calculation based on the output of the second magnetosensitive element, it is possible to detect a rotation angle with improved resolution according to the number of pairs of N pole and S pole in the second magnet. Further, in Patent Document 1, a plurality of pairs of N poles and S poles magnetized alternately along the circumferential direction of the rotor are used as a track, and a plurality of tracks are arranged in parallel in the radial direction of the rotor. In addition, it is disclosed that the detection accuracy of the angle of the rotating body is improved by configuring so that only the S pole of the other track is in contact with the N pole of one track between adjacent tracks. Assuming that there are two rows of tracks, this configuration can be said that the second magnet has a pair of N poles and S poles arranged in the radial direction of the rotor as a pole pair, and a plurality of pole pairs are annularly arranged so that the orientations of the N pole and S pole are opposite to each other between adjacent pole pairs.

CITATION LIST

Patent Document 1: Japanese Patent No. 5666886

In the rotary encoder having a first magnet and a second magnet disclosed in Patent Document 1, an absolute angular position of a rotating body can be obtained with high resolution, but in order to obtain the absolute angular position, it is necessary to perform A/D (analog/digital) conversion and arctangent calculation for each output of a first magnetosensitive element and a second magnetosensitive element. As a result, processing time and computation processing load increase.

At least an embodiment of the present invention provides a rotary encoder capable of detecting an absolute angular position without increasing the processing time and without increasing the arithmetic processing load.

A rotary encoder according to at least an embodiment of the present invention, the rotary encoder for detecting an angle of a rotating body with respect to a fixed body, comprising: a first sensor unit including a first magnet with a pair of N pole and S pole magnetized, and a first magnetosensitive unit facing the first magnet and detecting a component of phase A1 and a component of phase B1 different from the phase A1; a second sensor unit including a second magnet with a plurality of pairs of N poles and S poles alternately magnetized, and a second magnetosensitive unit facing the second magnet and detecting a component of phase A2 and a component of phase B2 different from the phase A2; a circuit for generating pulses for counting from an output of the second sensor unit; a counter for counting the pulses; wherein one of the first magnet and the first magnetosensitive unit is provided in the fixed body and the other is provided in the rotating body, and one of the second magnet and the second magnetosensitive unit is provided in the fixed body and the other is provided in the rotating body, and wherein during activation, an angle position of the rotating body is calculated and set as an initial value based on outputs of a first sensor unit and a second sensor unit, and after the activation, pulse counting is counted by a counter.

According to at least an embodiment of the present invention, an absolute angular position detection method in a rotary encoder, the rotary encoder comprising a first sensor unit and a second sensor unit, the first sensor unit includes a first magnet with a pair of N pole and S pole magnetized, and a first magnetosensitive unit facing the first magnet and detecting a component of phase A1 and a component of phase B1 different from the phase A1, and the second sensor unit includes a second magnet with a plurality of pairs of N poles and S poles alternately magnetized, and a second magnetosensitive unit facing the second magnet and detecting a component of phase A2 and a component of phase B2 different from the phase A2, one of the first magnet and the first magnetosensitive unit is provided in the fixed body and the other is provided in the rotating body, and one of the second magnet and the second magneto sensitive unit is provided in the fixed body and the other is provided in the rotating body, the method including the steps of: during activation, calculating and defining an angle position of the rotating body as an initial value based on outputs of the first sensor unit and the second sensor unit; and after the activation, starting counting by way of a counter with respect to pulses targeted for counting generated from outputs of the second sensor unit.

According to at least an embodiment of the present invention, during activation, angle position calculation is performed based on outputs of the first sensor unit and the second sensor unit and thereafter a movement amount is calculated based on a result of counting the pulses targeted for counting (cumulative number of pulses). In comparison with angle position calculation requiring A/D conversion and arc tangent calculation, pulse counting can be executed within a much shorter period of time and much smaller processing load, and therefore, in comparison with the case of carrying out angle position calculation every time, an angle position can be obtained within a shorter period of time.

In at least an embodiment of the present invention, it may be that: a first arithmetic unit configured to calculate an angle based on an output of the first sensor unit and a second arithmetic unit configured to calculate an angle based on an output of the second sensor unit are further provided; during activation, absolute angular position data for multiple rotations is generated and set as an initial value based on calculation in the first arithmetic unit and the second arithmetic unit; a value obtained by converting the absolute angular position data for multiple rotations to the count value in the counter is stored in the counter; and the counter performs counting while the stored value is set as a starting value. In such a configuration, by referring to the counter value, it may be possible to keep track of an absolute angle position for multiple rotations, although the position is approximate, that is, less accurate.

In at least an embodiment of the present invention, when an angle position is requested, absolute angular position data for multiple rotations may be calculated from the count value in the counter at the time point of such a request and an output of the second arithmetic unit, or alternatively, there may be a routine to further execute the steps of: storing in the counter the value obtained by converting the initial value to the count value in the counter during activation; calculating the angle position of the rotating body based on the output of the second sensor unit when the angle position is requested; and calculating absolute angular position data for multiple rotations from the result obtained in accordance with the step of performing calculation and the pulse count value at the time point at which the angle position is requested, and in the counter, counting may be performed while the stored value is set as a starting value. In this configuration, angle position calculation required to obtain an absolute angle position at a high resolution, after the initial value has been calculated, may be performed only relative to the output of the second sensor unit when the angle position is requested, and reduction of the processing time and reduction of the processing load can be achieved.

In at least an embodiment of the present invention, a pulse corresponding to each of timings obtained by dividing, into four sections, the length of one cycle in the output of the second sensor unit, can be employed. In practice, the Phase A2 and the Phase B2 are respectively shifted to each other, and a pulse can be thereby generated from the timing with which inversion of polarity in each of these phases occurs. Assuming that n N poles and n S poles are disposed in one column in the circumferential direction of the second magnet, the resolution exerted by the pulse is obtained as 8n per rotation of the rotating body, and the resolution of the approximate angle position can be enhanced.

In at least an embodiment of the present invention, there may be employed the first magnetosensitive unit consisting of: a magnetic resistance effect element equipped with a magnetic resistance pattern corresponding to the Phase A1 and a magnetic resistance pattern corresponding to the Phase B1; and a pair of Hall elements disposed at positions that are spaced from each other by 90 degrees as seen from the rotary shaft of the rotating body, and counting may be performed based on a combination of polarities of signals from the pair of Hall elements so as to generate multiple rotation data for Hall count. In this configuration, by employing the Hall elements, multiple rotation data can be easily obtained irrespective of what type of sensor is employed for angle position calculation.

In at least an embodiment of the present invention, the component of the Phase A1 and the component of the Phase B1 may be respectively shifted to each other in a phase corresponding to ¼ cycle of the sine wave signal that is output from the first sensor unit, and the component of the Phase A2 and the component of the Phase B2 may be respectively shifted to each other in a phase corresponding to ¼ cycle of the sine wave signal that is output from the second sensor unit. By employing such components that are respectively shifted to each other in phase, the respective components are represented by the sine function (sin) and the cosine function (cos), and a rotation angle can be easily calculated by arc tangent calculation.

According to at least an embodiment of the present invention, in a rotary encoder, an absolute angular position can be detected without increasing a processing time and a processing load.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a plan view illustrating a layout of a magnet, a magnetosensitive element, and a Hall element.

FIG. 3A and FIG. 3B are an equivalent circuit diagram of a magnetosensitive element.

FIG. 4 and FIG. 4B are a diagram for explaining the operation principle of a rotary encoder.

DETAILED DESCRIPTION

Figure 1:
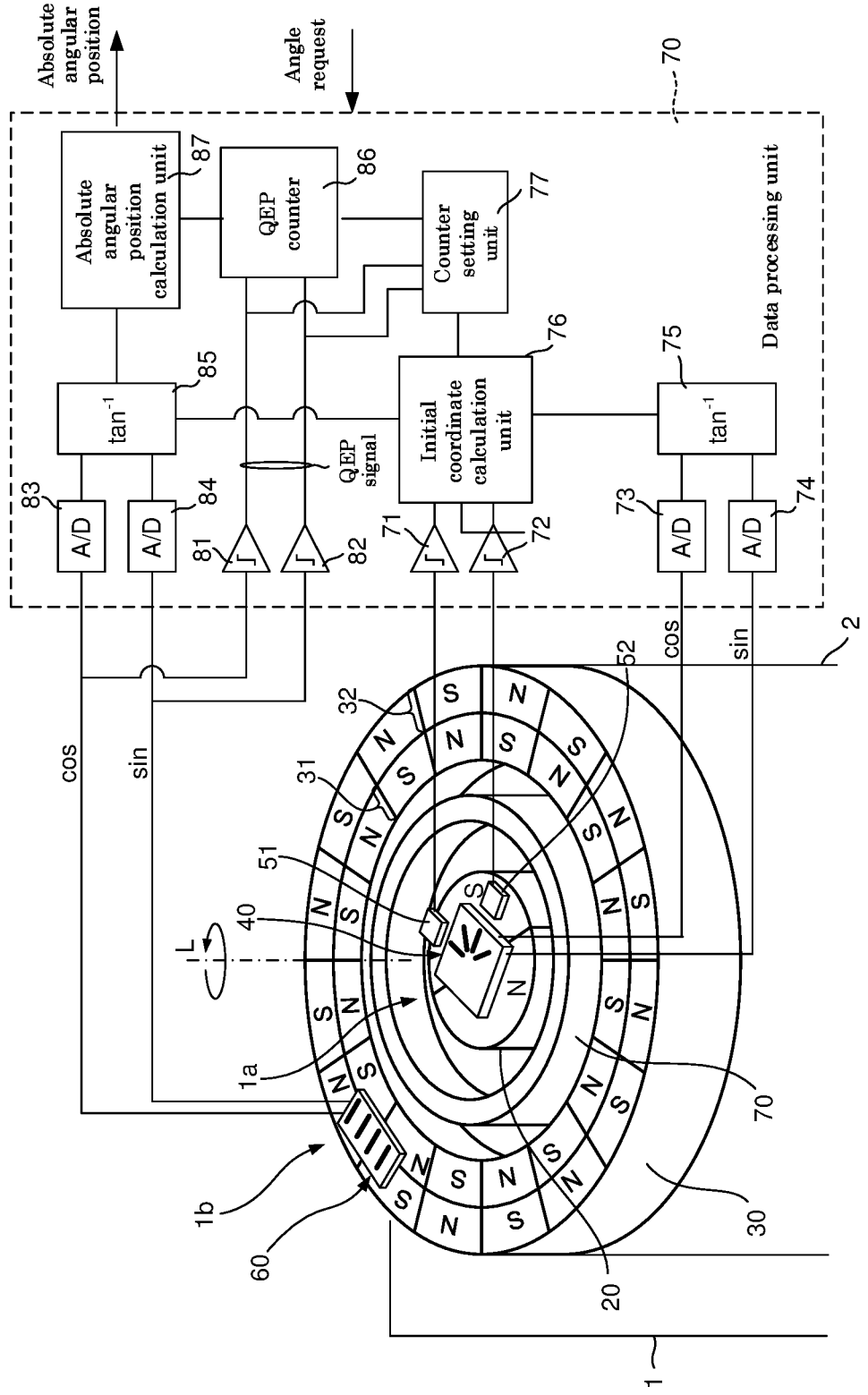
FIG. 1 is a diagram illustrating a rotary encoder according to one embodiment of the present invention.

Next, embodiments of the present invention will be described with reference to the drawings. FIG. 1 shows an overall structure used for determining a rotation angle of a rotary encoder according to one embodiment of the present invention. FIG. 2 shows an arrangement of a magnet, a magnetosensitive element, and a Hall element in the rotary encoder. As will be described later, the Hall element is provided for discriminating a quadrant of a rotation angle. The rotary encoder of the present embodiment is the same as that described in Patent Document 1 with respect to the appearance and mechanical structure, but different in a processing circuit for processing a signal output from a magnetosensitive element to determine an absolute angular position. Therefore, regarding the rotary encoder of the present embodiment, description of the appearance and the part to be attached to a measuring object will be omitted. In addition, the rotary encoder is configured as a multi-rotation rotary encoder capable of knowing the number of rotations of a rotating body from a predetermined origin position.

The rotary encoder includes a rotating body connected to a rotation axis of a measuring object such as a motor, and a fixed body being fixed without connecting to a rotation axis of a measuring object. A rotating body is provided with a first magnet, a second magnet, and a shield member 70 provided between the first magnet and the second magnet for magnetically shielding between them. In FIG. 1, an axial direction of a rotation axis L of the rotating body is indicated by a chain line. In FIG. 1, an axial direction of a rotation axis L of the rotating body is indicated by a chain line. Signs of "N" and "S" attached to each of the magnets 20 and 30 indicate that the positions indicated by the signs are magnetized surfaces being magnetized in polarities indicated by the signs. A fixed body 1 is provided with a first magnetosensitive element 40 for detecting a magnitude of a magnetic field generated by the first magnet 20, first and second Hall elements 51, 52 for detecting a polarity of a magnetic field generated by the first magnet, and a second magnetosensitive element 60 for detecting a magnetic field generated by the second magnet 30. A first sensor unit 1a is composed of the first magnet 20, the first magnetosensitive element 40, and the first and second Hall elements 51, 52. A second sensor unit 1b is composed of the second magnet 30 and the second magnetosensitive element 60. A first magnetosensitive unt is composed of the first magnetosensitive element 40 and the first and second Hall elements 51, 52. A second magnetosensitive unit is composed of the second magnetosensitive element 60.

In the first sensor unit 1a, the first magnet 20 provided in the rotating body has a magnetized surface with an N pole and an S pole polarized in a circumferential direction. The shape combining the magnetized surfaces of both the N pole and the S poles is almost circular, and the center thereof coincides with the rotation axis L. The first magnetosensitive element 40 provided in the fixed body 1 faces the magnetized surface of the first magnet 20. The first and second Hall elements 51 and 52 are provided corresponding to the magnetized surface of the first magnet 20 to be separated from each other by 90° as viewed from the rotation axis. The first magnetosensitive element 40 is constituted by, for example, a magnetoresistive effect element, and composed of four magnetoresistive patterns 41 to 44 having an elongated shape to detect a component of a magnitude of a magnetic field that is mutually shifted by 90° un electrical angle in the phase of the rotation of the rotation axis L. An electrical angle will be described later. The magnetoresistive patterns 41 to 44 are arranged in a fan shape separated by 45° around the rotation axis. The magnetoresistive patterns 41 and 43 correspond to the phase A1 and are connected in parallel between the power supply voltage Vcc and the ground potential GND to constitute a bridge circuit as shown in FIG. 3A so that a differential output expressed by ±a from each midpoint can be obtained. Similarly, the resistance patterns 42 and 44 correspond to the phase B1 and are concatenated in parallel between the power supply voltage Vcc and the ground potential GND to constitute a bridge circuit as shown in FIG. 3B so that a differential output expressed by ±b from each midpoint can be obtained. As described above, in the first sensor unit 1a, a pair of N pole and S pole is used as the first magnet 20, so the first sensor unit 1a is also referred to as a 1-division sensor unit.

As will be described later, in the rotary encoder, the phase A1 and the phase B1 change sinusoidally by two cycles while the rotating body actually makes one rotation. Therefore, in the rotary encoder, the actual rotation angle (angle geometrically or mechanically taken) of the rotating body is called a mechanical angle, and the angle determined from the phase of the signal from the magnetosensitive element is called an electrical angle. In the case of using an element that can detect only a magnitude of a magnetic field and cannot detect a polarity of a magnetic field, the electrical angle is expressed as a value twice the mechanical angle. Since the magnetoresistive patterns 41 and 43 corresponding to the phase A1 and the magnetoresistive patterns 42 and 44 corresponding to the phase B1 are shifted to generate a phase difference of 90° in electrical angle, the phase A1 corresponds to a sine component (sin), and the phase B1 corresponds to a cosine component (cos). The magnetoresistive patterns 41 and 43 respectively correspond to (sin−) and (sin+) components having a phase difference of 180° in electrical angle, and the magnetoresistive patterns 42 and 44 respectively correspond to (cos−) and (cos+) components having a phase difference of 180°.

In the second sensor unit 1b, the second magnet 30 provided in the rotating body 2 is annular coaxial with the rotation axis L, and is provided to be spaced away from the first magnet 20 outside in the radial direction. The second magnet 30 includes two annular tracks 31, 32 composed of annular magnetized surfaces in which N poles and S poles are alternately magnetized at equal intervals in the circumferential direction, and these tracks 31, 32 are mutually contacted in the radial direction. Between the inner track 31 and the outer track 32, the N pole and the S pole are shifted by one pole in the circumferential direction. As a result, assuming a pole pair in which N poles and S poles are arranged in the radial direction as viewed from the rotation axis L, in the second magnet 30, a plurality of pole pairs are annularly arranged so that the orientations of the N pole and the S pole are opposite between adjacent pole pairs. Assuming that n-number of (n is an integer of 2 or more) N poles and n-number of S poles are provided as magnetized surfaces for each of the tracks 31 and 32, the number of pole pairs is 2n. The number 2n of pole pairs is 16 in FIG. 1 for explanation, but in practice it is 128, for example. The second magnetosensitive element 60 provided in the fixed body 1 is constituted by, for example, a magnetoresistive effect element, and arranged corresponding to a position where the tracks 31, 32 are in contact with each other, to be faced to the magnetized surface of the second magnet 30. The intensity of the magnetic field by the second magnet 30 changes in a sinusoidal shape in the circumferential direction along the position where the tracks 31 and 32 contact each other with the length of one pole of N pole or S pole (2.8125° in mechanical angle because 360/128=2.8125 if the pole pair number is 128) as a cycle. Therefore, regarding the second magnet 30, the length of one pole of N pole or S pole corresponds to 360° in electrical angle. Since the second sensor unit 1b is provided with a plurality of pairs of the N pole and S pole as the second magnet 30, the second sensor unit 1b is also referred to as a multi-division sensor unit.

In the second magnetic sensing element 60, four magnetic resistance patterns 61 to 64 are disposed along the circumferential direction at intervals that are ¼ of the length for the single pole in the circumferential direction. The magnetic resistance patterns 61 to 64 each have an elongated shape extending in the radial direction of the rotating body 2. The second magnetic sensing element 60 is provided in association with the second magnet 30 so that a center of the sensing element is present on a position at which the tracks 31, 32 come into contact with each other. In the second magnetic sensing element 60, as is the case with the first magnetic sensing element 40, the magnetic resistance patterns in the Phase A2 (sin) and the magnetic resistances pattern of the Phase B2 (cos), each of which has a phase difference of 90 degrees in electrical angle relative to the phase of the second magnet 30, are configured with the magnetic resistance patterns 61 to 64. The magnetic resistance patterns of the Phase A2 consist of the magnetic resistance pattern 64 of the (sin+) component and the magnetic resistance pattern 62 of the (sin−) component, and the magnetic resistance patterns of the Phase B2 consist of the magnetic resistance pattern 63 of the (cos+) component and the magnetic resistance pattern 61 of the (cos−) component. As is the case with the first magnetic sensing element 40, the magnetic resistance patterns 62, 64 of the Phase A2 configure the bridge circuit shown in FIG. 3A, and the magnetic resistance patterns 61, 63 of the Phase B2 configure the bridge circuit shown in FIG. 3B. Here, although the inside track 31 and the outside track 32 are provided, either one of these tracks may be merely provided, and the second magnetic sensing element 60 may be disposed in association with a center position of that track, and in a case where these tracks are thus disposed as well, a procedure for absolute angle position calculation in the embodiment can be applied as it is.

In the rotary encoder of the present embodiment, in order to detect the absolute angular position of the rotating body 2 at multiple rotations, the outputs of the first magnetosensitive element 40, the second magnetosensitive element 60 and the Hall elements 51, 52 are supplied to the data processing unit 70 as a processing circuit. In FIG. 1, the signal lines of the sin component and the cos component of each of the first magnetosensitive element 40 and the second magnetosensitive element 60 are indicated by one line, but actually, each signal line is a differential signal line as is apparent from the equivalent circuit diagram of FIG. 3. The data processing unit 70 is provided with comparators 71 and 72, which receive the outputs of the first and second Hall elements 51, 52 and output the directions of the magnetic field detected by the Hall elements 51, 52 as binary signals of H/L, A/D converters 73 and 74, which receive the cos component and the sin component of the first magnetosensitive element 40 and perform analog/digital (A/D) conversion, comparators 81 and 82, which receive the cos component and the sin component of the second magnetosensitive element 60 and discriminate positive and negative polarities of the components, and A/D converters 83 and 84, which receive the cos component and the sin component of the second magnetosensitive element 60 and perform analog/digital (A/D) conversion. Further, the data processing unit 70 is provided with an arithmetic unit 75 for performing an arctangent ($\tan^{-1}$) calculation based on the outputs of the A/D converters 73 and 74, an arithmetic unit 85 for performing an arctangent ($\tan^{-1}$) calculation based on the outputs of the A/D converters 83 and 84, an initial coordinate calculation unit 76 for calculating an absolute position angle at the time of startup of the rotary encoder based on the outputs of the comparators 71, 72, 81, 82 and the outputs of the arithmetic units 75, 85, a counter setting unit 77, a QEP counter 86 which uses the outputs of the comparators 81, 82 as a QEP signal to be described later and performs calculation based on the QEP signal, and an absolute angular position calculation unit 87, which calculates and outputs the absolute angular position at multiple rotations based on the counted value at the QEP counter 86 and the calculation result in the arithmetic unit 85, when an angle request is input from the outside. The counter setting unit 77 sets an initial value of the count in the QEP counter 86 based on the calculation result in the initial coordinate calculation unit 76.

In the data processing unit 70, each of the comparators 71, 72, 81, 82, the A/D converters 73, 74, 83, 84, the arithmetic units 75, 85, the initial coordinate calculation unit 76, the counter setting unit 77, the QEP counter 86, and the absolute angular position calculation unit 87 may be provided as a hardware circuit component. Alternatively, the arithmetic units 75 and 85, the initial coordinate calculation unit 76, the counter setting unit 77, the QEP counter 86 and the absolute angular position calculation unit 87 are provided as a microprocessor or CPU, and the comparators 71, 72, 81, 82 and the A/D converters 73, 74, 83, 84 may be provided as a hardware circuit connected to the microprocessor. When a microprocessor (or a CPU) having a comparator function and an A/D function can be used, the entire data processing unit may be configured as a microprocessor or a CPU.

Next, the detection principle of the rotary encoder of the present embodiment will be described with reference to FIG. 4. FIG. 4A, regarding the first sensor unit 1a and considering one point in the fixed body 1, shows how the polarity and intensity of the magnetic field formed by the first magnet 20, the outputs (sin and cos) from the first magnetosensitive element 40, and the first and second Hall elements 51, 52 changes with respect to a change in the mechanical angle of the rotating body 2. However, in the following description, the outputs of the first and second Hall elements 51 and 52 are indicated by H or L binary signals obtained via the comparators 71 and 72. As shown in the figure, when the rotating body 2 rotates and the first magnet 20 makes one rotation (360°) in mechanical angle, the sinusoidal signals sin and cos are output from the first magnetosensitive element 40 for two cycles, that is, by 720° in electrical angle. Assuming that the electrical angle is θ, as shown in FIG. 4B, by calculating θ=$\tan^{-1}$ (sin/cos) according to these signals, sin and cos, the angular position of the rotating body 2 can be determined as an electrical angle θ. However, in the example described here, since a magnetoresistive element is used and an electrical angle makes two rotations during one rotation of a mechanical angle, the absolute angular position cannot be obtained only by this θ. Therefore, first and second Hall elements 51 and 52 provided at 90° apart from each other as viewed from the center of the first magnet 20 are used. According to the first and second Hall elements 51 and 52, since the polarity of the magnetic field generated by the first magnet 20 is discriminated, and as indicated by a one-dot chain line in FIG. 4A, it is known in which quadrant in the plane coordinate system the rotation angle by the mechanical angle is located, it is possible to obtain the absolute angular position by the mechanical angle of the rotating body 2. Also, since the signals of the first and second Hall elements 51 and 52 do not change at the same time, if counting is performed by adding 1 each time the signal changes in either of them, it is possible to obtain multi-rotation data in units of quadrants (90°) at a mechanical angle. Such multi-rotation data is referred to as Hall count multi-rotation data.

For the second sensor unit 1b, if the lengths of two adjacent pole pairs in the second magnet 30 in the circumferential direction are considered as two rotations (720°) in electrical angle, similarly to the case of the above-described first sensor unit 1a, it is possible to determine the absolute angular position (here, the position in the circumferential direction in two adjacent poles in the circumferential direction under consideration). For the two rotations, the sinusoidal waveforms of sin and cos also change by two rotations in electrical angle. Since the second sensor unit 1b is a multi-division sensor unit, the absolute angular position can be determined with higher resolution than the first sensor unit 1a. Therefore, by combining the rough absolute angular position by the first sensor unit 1a and the fine absolute angular position by the second sensor unit 1b, it is possible to determine the absolute angular position with high resolution as a whole. Since the rough absolute angular position can be found from the result of the first sensor unit 1a, in the second sensor unit 1b, it is unnecessary to provide a member equivalent to the first and second Hall elements 51 and 52 in the first sensor unit 1a.

In the above explanation, the arithmetic units 75 and 85 perform arctangent calculation ($\tan^{-1}$ (sin/cos)). In the arctangent calculation here, if the cos component is 0, it results in division by zero and the calculation is impossible, and if the cos component is close to 0, a calculation error increases. In such a case, as is well known, the rotation angle θ can be obtained by performing arc cotangent ($\cot^{-1}$ or arc cot) calculation and subtracting the obtained value from 90°. In general, a value range of an arctangent function (cot) is −90°<θ<+90°. However, in the present embodiment, considering the signs of sin and cos, the rotation angle θ is obtained in the range of 0°<θ<360°. In this specification, arctangent calculation means to obtain θ in the range of 0°<θ<360°, including the arc cotangent calculation to be performed when the cos component is close to 0 as in such a case. In addition, one rotation of mechanical angle corresponds to two rotations of electrical angle, because of using a sensor that can detect an intensity of a magnetic field but cannot discriminate a polarity of a magnetic field. In the first magnetosensitive element 40, when using an element, such as a Hall element or the like that can detect an intensity of a magnetic field and can detect a polarity of the magnetic field at the same time and signs of an output is determined depending on a polarity of a magnetic field, as will be appreciated by those skilled in the art, the above description needs to be modified to that one rotation of mechanical angle corresponds one rotation of electrical angle. In this case, it is unnecessary to provide the first and second Hall elements 51 and 52 being provided separately for determining a quadrant of a rotation angle. Further, when a Hall element or the like is used in the second magnetosensitive element 60, the length of two pole pairs adjacent in the circumferential direction is regarded as one rotation (360°) in electrical angle.

Next, the processing in the rotary encoder of this embodiment will be described. In this rotary encoder, an absolute angular position based on the first sensor unit 1a is determined by the A/D converters 73, 74 and the arithmetic unit 75, and based on the determined absolute angular position and the results obtained by the A/D converters 83, 84 and the arithmetic unit 85, a final absolute angular position with high resolution can be obtained. However, since the process of A/D conversion and arctangent calculation in each arithmetic unit 75, 85 require increased processing time and processing load, it is preferable not to do them as much as possible. Therefore, in the rotary encoder of the present embodiment, after calculating an absolute angular position with high resolution at the time of startup (or when specified), the cos and sin components from the second magnetosensitive element 60 of the second sensor unit 1b are processed by the comparators 81 and 82 to generate a QEP (Quadrature Encoder Pulse) signal, and only the QEP signal is counted. Then, when there is an angle request from the outside, an absolute angular position is calculated based only on the second sensor unit 1b, and this is combined with the count value of the QEP signal to obtain final multi-rotation absolute angular position data. In such operation, the A/D converters 73, 74 related to the first sensor unit 1a and the arithmetic unit 75 are used only at the time of startup.

Figure 5:
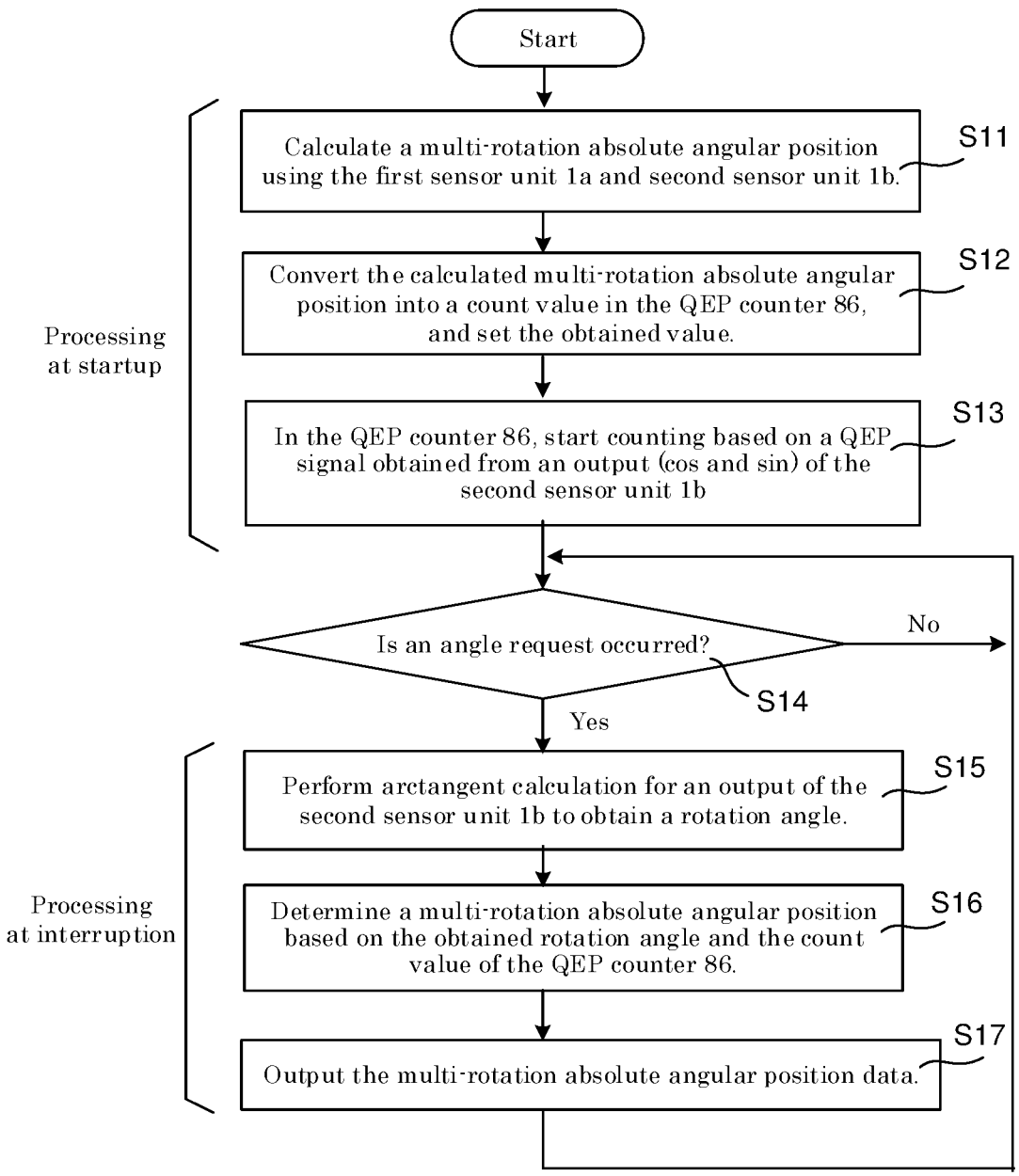
FIG. 5 is a flowchart showing the operation of a rotary encoder.

FIG. 5 is a flowchart for explaining the operation in this embodiment. When the rotary encoder is started, first in S11, the A/D converters 73, 74, 83, 84 and the arithmetic units 75, 85 are operated, angular position calculation is performed based on the signals of the cos and sin components from each of the first sensor unit 1a and the second sensor unit 1b, and based on the results obtained from them and the results of the first and second Hall elements 51 and 52, the initial coordinate calculation unit 76 determines an initial value of a multi-rotation absolute angular position. Next, in S12, the counter setting unit 77 converts the obtained multi-rotation absolute angular position into the count value in the QEP counter 86, and supplies the value obtained by the conversion to the QEP counter 86 as an initial value that is a start value of counting. Thereafter, in S13, counting by the QEP signal is started based on the outputs (cos and sin) of the second sensor unit 1b in the QEP counter 86.

Here, the QEP signal will be described. The QEP signal is a pulse for counting generated from the output of the second sensor unit 1b. The signs of cos and sin components obtained from the second magnetosensitive element 60 of the second sensor unit 1b are reversed each time an electrical angle in the second sensor unit 1b is changed by 180°, and the signs of both components are shifted by 90° in electrical angle. If 1 is added to or subtracted from the count value of the QEP counter 86 each time the sign of either cos or sin is reversed, the count value changes by 4 every electrical angle of 360°. Whether to perform addition or subtraction depends on whether the rotating body 2 rotates in the forward direction or in the reverse direction. Assuming that the binary signal (H or L signal) output from the comparators 81 and 82 are Qc and Qs, respectively, the QEP signal can be represented as (Qc, Qs). If the rotating body 2 rotates in the forward direction, (Qc, Qs) changes as (H, L)→(H, H)→(L, H)→(L, L)→(H, L)→. On the other hand, if it rotates in the reverse direction, (Qc, Qs) changes (H, L)→(L, L)→(L, H)→(H, H)→(H, L)→. Therefore, by detecting how the QEP signal has changed from a certain point of time, the rotation direction of the rotating body 2 can be known. For example, assuming that (Q, Q) is (H, H), if it changes from this state to (L, H), then it is judged to be normal rotation, and if it changes to (H, L), it is judged to be reverse rotation. Since whether to add or subtract 1 is selected according to the forward rotation or reverse rotation, even if rotating in the reverse direction while rotating forward and then rotating forward, the absolute angular position of the rotation can be correctly obtained. Since the number 2n of pole pairs is 128, the count value of the QEP counter 86 changes by 512 (=4×128) with one mechanical angle rotation. The remainder obtained by dividing the value of the QEP counter 86 by 512 means that the pole pair of the second magnet 30 to which the mechanical angle at that point corresponds is indicated by 2 bits per a pole pair. By continuing the counting in the QEP counter 86, multi-rotation data can be obtained. This multi-rotation data is data indicating the absolute angular rotation position considering the rotation direction.

While counting the accumulation by the QEP counter 86, whether or not an interruption of angle request occurs is judged in S14, and if the interruption does not occur, the process returns to S14 to wait for the interruption. If the interruption of angle request occurs, in S15, the A/D converters 83, 84 of the second sensor unit 1b and the arithmetic unit 85 are operated, and arctangent calculation is performed for the output of the second magnetosensitive element 60 of the second sensor unit 1b to obtain the rotation angle. In S16, the absolute angular position calculation unit 87 obtains the multi-rotation absolute angular position based on the obtained rotation angle and the count value of the QEP counter 86 at this time, and outputs the absolute angular position data in S17. Since this absolute angular position data is based on the detection result by the second sensor unit 1b, it has sufficient resolution. In addition, since the accumulation has been continued by the QEP counter 86, it is also multi-rotation data. Thereafter, the process returns to S14 to prepare for the next angle request.

Figure 6:
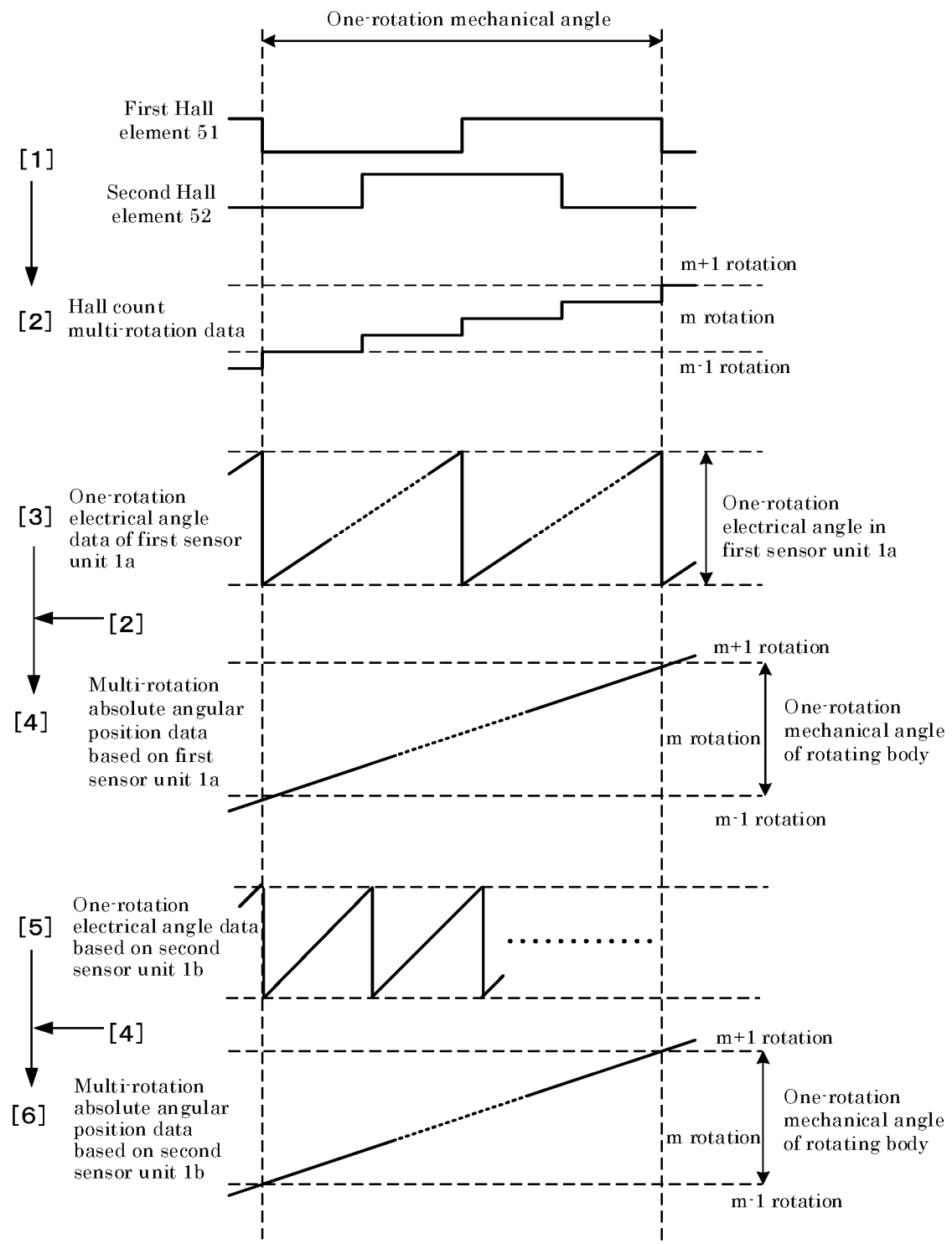
FIG. 6 is a diagram explaining a method of determining an absolute angular position.
Figure 7:
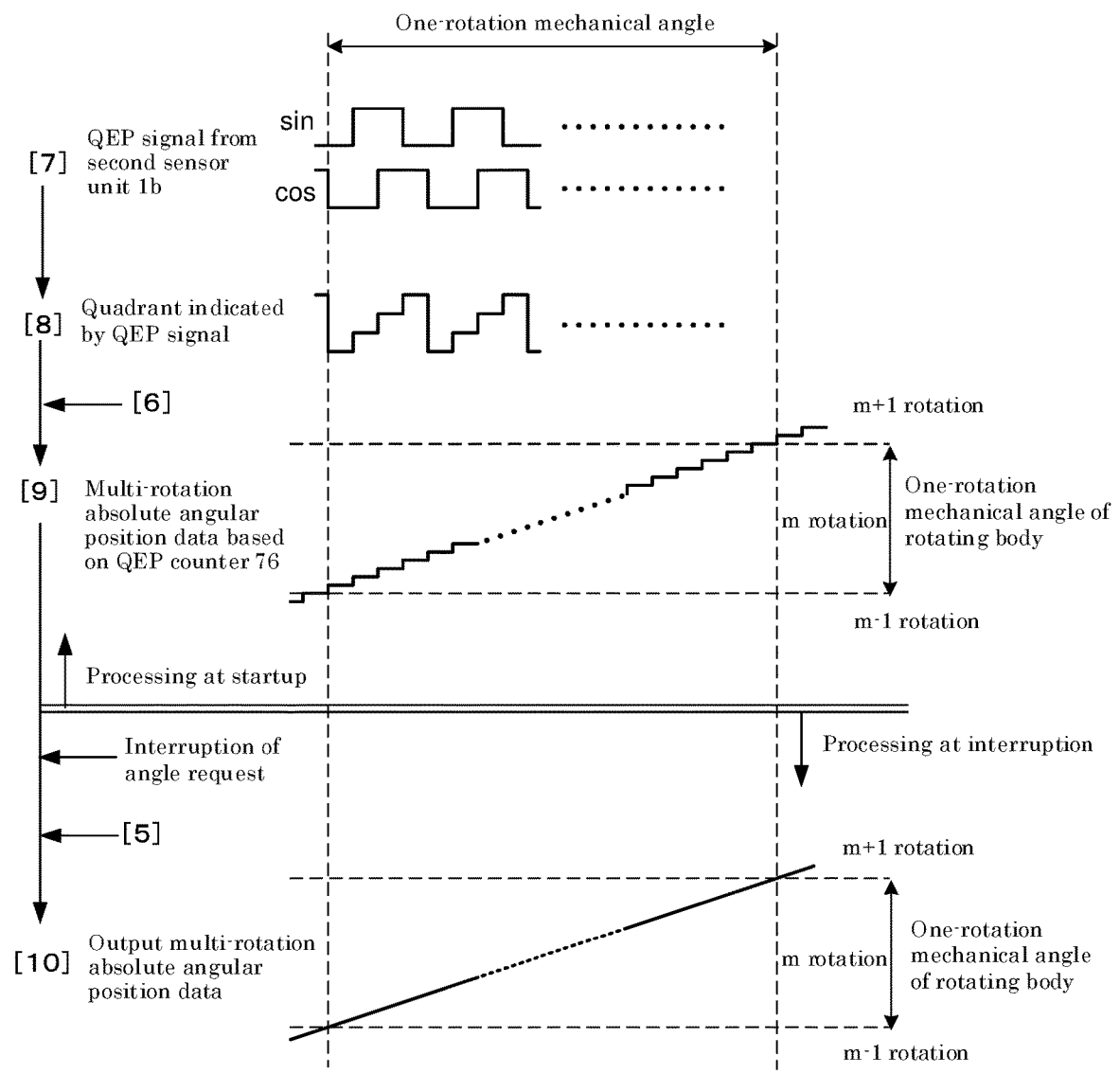
FIG. 7 is a diagram explaining a method of determining an absolute angular position.

The above operation will be described in further detail with reference to FIG. 6 and FIG. 7 by showing each item of data relative to a change of a mechanical angle and a change of each signal. In FIG. 6, bracketed reference numeral [1] designates a change of outputs of the first and second Hall elements 51, 52, and the outputs of the Hall elements 51, 52 each change every 180 degrees in mechanical angle and have a phase difference of 90 degrees. Assuming that the outputs of the Hall elements 51, 52 are respectively Hc, Hs, the mode of the change of (Hc, Hs) is different depending on the rotation direction of the rotating body 2 as in the QEP signal (Qc, Qs) described above. Therefore, when an output of either one of the Hall elements 51, 52 has changed based on the outputs of the Hall elements 51, 52, the counting of adding or subtracting 1 is performed according to the rotation direction, and the multiple rotation data for Hall count designated by bracketed reference numeral [2] can be thereby obtained. The multiple rotation data for Hall count is the data corresponding to an absolute rotation position of rotation as well. In FIG. 6, as the multiple rotation data, a change of the data in the m-th rotation (m rotations) is shown. In addition, arc tangent calculation is performed by the arithmetic unit 75 relative to an output of the first magnetic sensing element 40 of the first sensor unit 1a, and the single rotation data for electrical angle designated by bracketed reference numeral [3] can be thereby obtained. The single rotation data for electrical angle is the data indicative of a rotation angle, and is the data which is restored when the electrical angle makes a single rotation (data which does not include cumulative number of rotations as well. Here, a single rotation in mechanical angle corresponds to an electrical angle equivalent to double rotations, and therefore, the single rotation data for electrical angle is incremental angle data of which number of rotations is obtained as double rotations relative to a single rotation in mechanical angle. The multiple rotation data for Hall count designated by bracketed reference numeral [2] and the single rotation data for electrical angle designated by bracketed reference numeral [3] are combined with each other, and the absolute angular position data for multiple rotations designated by bracketed reference numeral [4] can be thereby obtained with reference to the first sensor unit 1a (that is, one-split sensor unit).

On the other hand, arc tangent calculation is performed by the arithmetic unit 85 relative to an output of the second magnetic sensing element 60 of the second sensor unit 1b, and the single rotation data for electrical angle designated by bracketed reference numeral [5] can be thereby obtained in such a manner as to make a single rotation in length in the circumferential direction of one pole pair. If the pole pair number is 128, it follows that the single rotation data for electrical angle designated by bracketed reference numeral [5] has 128 cycles in the range of a single rotation in mechanical angle. The single rotation data for electrical angle of the second sensor unit 1b designated by bracketed reference numeral [5] and the absolute angular position data for multiple rotations with reference to the first sensor unit 1a designated by bracketed reference numeral [4] are combined with each other, and the absolute angular position data for multiple rotations with reference to the second sensor unit 1b designated by bracketed reference numeral [6] can be thereby obtained. The absolute angular position data for multiple rotations designated by bracketed reference numeral [6] has a higher resolution than that of the absolute angular position data for multiple rotations designated by bracketed reference numeral [4]. The processing operation to be made until the absolute angular position data for multiple rotations designated by bracketed reference numeral [6] has been obtained is the processing operation in S11 shown in FIG. 5.

Bracketed reference numeral [7] designates QEP signals obtained by the comparators 81, 82 determining the polarities of the cos component and the sin component from the second magnetic sensing element 60 of the second sensor 1b. The QEP signals are a pair of signals of which phases are respectively shifted to each other by 90 degrees, each of which is inverted by 180 degrees when represented by the electrical angle of the second sensor unit 1b, and as shown in bracketed reference numeral [8], these signals are indicative of the quadrant in electrical angle of the second sensor unit 1b. Here, the absolute angular position data for multiple rotations designated by bracketed reference numeral [6] and the quadrant in QEP signal designated by bracketed reference numeral [8] are combined with each other, and the absolute angular position data for multiple rotations designated by bracketed reference numeral [9] can be thereby obtained in such a manner as to change stepwise by 90 degrees in electrical angle in the second sensor unit 1b. The absolute angular position data for multiple rotations designated by bracketed reference numeral [9] is the data that changes every time 1 is added to or subtracted from the count value of the QEP counter 86 and thus this data is referred to as the absolute angular position data for multiple rotations with reference to the QEP counter 86. In S12 (FIG. 5), the counter setting unit 77 sets, at the QEP counter 86, the absolute angular position data for multiple rotations with reference to the QEP counter 86 as an initial value. Afterwards, the QEP counter 86 starts (S13 of FIG. 5) counting based on the QEP signal. The operation during activation in the rotary encoder according to the present embodiment has been described hereinbefore. The absolute angular position data for multiple rotations with reference to the QEP counter 86, the data being designated by bracketed reference numeral [9], is gradually increased by the counting operation of the QEP counter 86.

When an interrupt for angle request occurs, the single rotation data for electrical angle of the second sensor unit 1b, the data being designated by bracketed reference numeral [5] at the time point of the interrupt, is obtained in S15 (FIG. 5), and the single rotation data for electrical angle and the absolute angular position data for multiple rotations with reference to the QEP counter 86, each of which is designated by bracketed reference numeral [9] at the time point of interruption, are combined with each other in S16 (FIG. 5) to thereby generate the absolute angular position data for multiple rotations which should be output, the data being designated by bracketed reference numeral [10]. In S17 (FIG. 5), a response to an angle request is output from the outside. Here, although the absolute angular position data for multiple rotations designated by bracketed reference numeral [10] is shown as the data which smoothly changes relative to a mechanical angle, in practice, the absolute angular position data for multiple rotations at the time point of an interrupt is merely calculated. In addition, the accuracy of the absolute angular position data for multiple rotations designated by bracketed reference numeral [10] is identical to that of the absolute angular position data for multiple rotations with reference to the second sensor unit 1b, the data being designated by bracketed reference numeral [6].

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A rotary encoder for detecting an angle of a rotating body with respect to a fixed body, the rotary encoder comprising:
   a first sensor unit comprising a first magnet with a pair of N pole and S pole magnetized, and a first magnetosensitive unit facing the first magnet and detecting a component of phase A1 and a component of phase B1 different from the phase A1;
   a second sensor unit comprising a second magnet with a plurality of pairs of N poles and S poles alternately magnetized, and a second magnetosensitive unit facing the second magnet and detecting a component of phase A2 and a component of phase B2 different from the phase A2;
   a circuit structured to generate pulses for counting from an output of the second sensor unit;
   a counter structured to count the pulses;
   wherein one of the first magnet and the first magnetosensitive unit is provided in the fixed body and the other is provided in the rotating body, and one of the second magnet and the second magnetosensitive unit is provided in the fixed body and the other is provided in the rotating body, and
   wherein during activation, an angle position of the rotating body is calculated and set as an initial value based on outputs of the first sensor unit and the second sensor unit, and after the activation, pulse counting is counted by the counter.

2. The rotary encoder according to claim 1, further comprising:
   a first arithmetic unit configured to calculate an angle based on an output of the first sensor unit; and
   a second arithmetic unit configured to calculate an angle based on an output of the second sensor unit,
   wherein during the activation, absolute angular position data for multiple rotations is generated and set as the initial value based on calculation in the first arithmetic unit and second arithmetic unit, a value obtained by converting the absolute angular position data for multiple rotations to a count value is stored in the counter, and the counter performs counting while the stored value is set as a starting value.

3. The rotary encoder according to claim 2, wherein when an angle position is requested, absolute angular position data for multiple rotations is calculated from the count value in the counter and an output of the second arithmetic unit at a time point of the request.

4. The rotary encoder according to, wherein the pulse corresponds to each of timings with which a length of one cycle in output of the second sensor unit is divided into four sections.

5. The rotary encoder according to claim 4, wherein
   the first magnetosensitive unit comprises a magnetic resistance effect element which comprises a magnetic resistance pattern corresponding to the Phase A1 and a magnetic resistance pattern corresponding to the Phase B1; and
   a pair of Hall elements disposed at positions respectively spaced from each other by 90 degrees as seen from a rotary shaft of the rotating body, and wherein multiple rotation data for Hall count is generated by performing counting based on a combination of polarities of signals from the pair of Hall elements.

6. The rotary encoder according to claim 1, wherein a component of the Phase A1 and a component of the Phase B1 are respectively shifted to each other in a phase corresponding to ¼ cycle of a signal of a sine wave which is output from the first sensor unit, and
   wherein a component of the Phase A2 and a component of the Phase B2 are respectively shifted to each other in a phase corresponding to ¼ cycle of a signal of a sine wave which is output from the second sensor unit.

7. The rotary encoder according to claim 1, wherein
   the first magnetosensitive unit comprises a magnetic resistance effect element which comprises a magnetic resistance pattern corresponding to the Phase A1 and a magnetic resistance pattern corresponding to the Phase B1; and
   a pair of Hall elements disposed at positions spaced from each other by 90 degrees in phase as seen from a rotary shaft of the rotating body, and wherein multiple rotation data for Hall count is generated by performing counting based on a combination of polarities of signals from the pair of Hall elements.

8. The rotary encoder according to claim 7, wherein a component of the Phase A1 and a component of the Phase B1 are respectively shifted to each other in a phase corresponding to ¼ cycle of a signal of a sine wave which is output from the first sensor unit, and wherein a component of the Phase A2 and a component of the Phase B2 are respectively shifted to each other in a phase corresponding to ¼ cycle of a signal of a sine wave which is output from the second sensor unit.

9. An absolute angular position detection method in a rotary encoder, the rotary encoder comprising a first sensor unit and a second sensor unit, the first sensor unit comprises a first magnet with a pair of N pole and S pole magnetized, and a first magnetosensitive unit facing the first magnet and detecting a component of phase A1 and a component of phase B1 different from the phase A1, and the second sensor unit comprises a second magnet with a plurality of pairs of N poles and S poles alternately magnetized, and a second magnetosensitive unit facing the second magnet and detecting a component of phase A2 and a component of phase B2 different from the phase A2, one of the first magnet and the first magnetosensitive unit is provided in the fixed body and the other is provided in the rotating body, and one of the second magnet and the second magnetosensitive unit is provided in the fixed body and the other is provided in the rotating body, the method comprising:

during activation, calculating and defining an angle position of the rotating body as an initial value based on outputs of the first sensor unit and the second sensor unit; and after the activation, starting counting by way of a counter with respect to pulses targeted for counting generated from outputs of the second sensor unit.

10. The absolute angular position detection method of claim 9, further comprising:

during the activation, storing in the counter a value obtained by converting the initial value by a count value in the counter;

when an angle position is requested, calculating the angle position of the rotating body based on an output of the second sensor unit;

calculating absolute angular position data for multiple rotations from a result obtained in accordance with the calculating step and a count value of the pulse at a time point at which the angle position is requested, wherein in the counter, counting is performed while the stored value is set as a starting value.

* * * * *